Aug. 10, 1965
P. E. BAER
3,199,535
BALANCED HYDRAULIC VALVE ASSEMBLY
Filed July 13, 1962
6 Sheets-Sheet 1
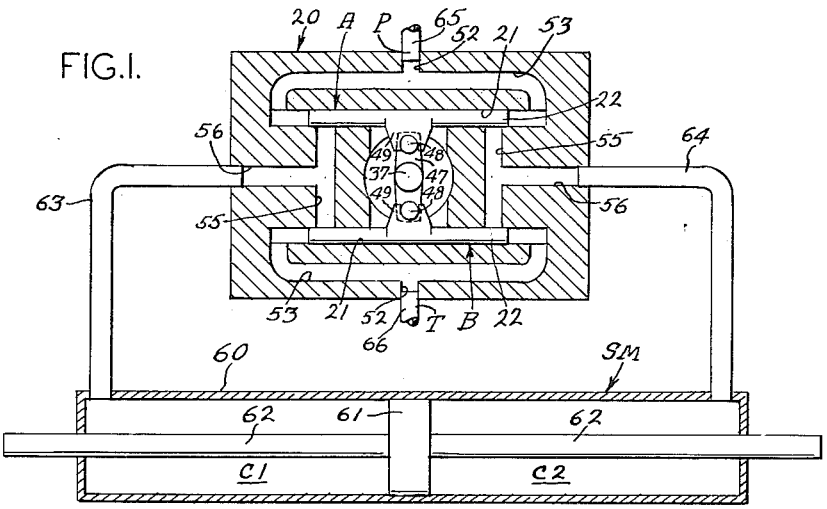
FIG. 1.
FIG. 2a.
FIG. 2.
FIG. 12.
FIG. 12a.
INVENTOR:
PETER E. BAER
BY
Howson & Howson
ATTYS Aug. 10, 1965 P. E. BAER 3,199,535
BALANCED HYDRAULIC VALVE ASSEMBLY
Filed July 13, 1962 6 Sheets-Sheet 2
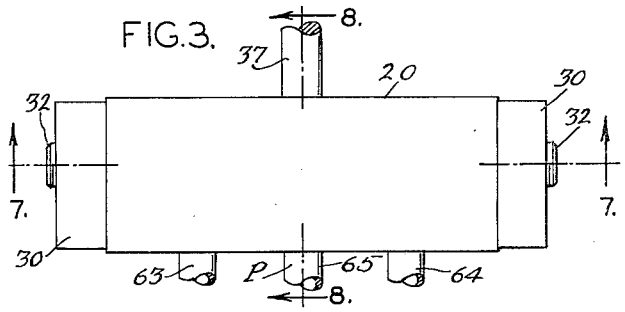
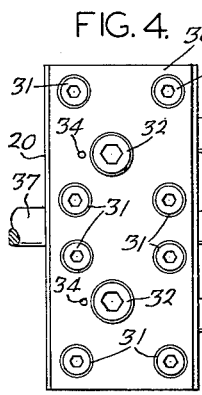
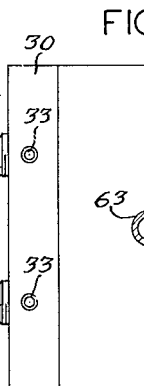
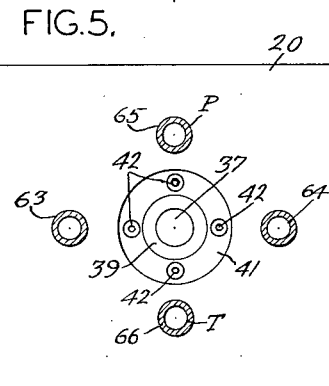
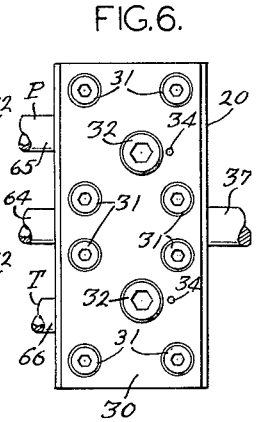
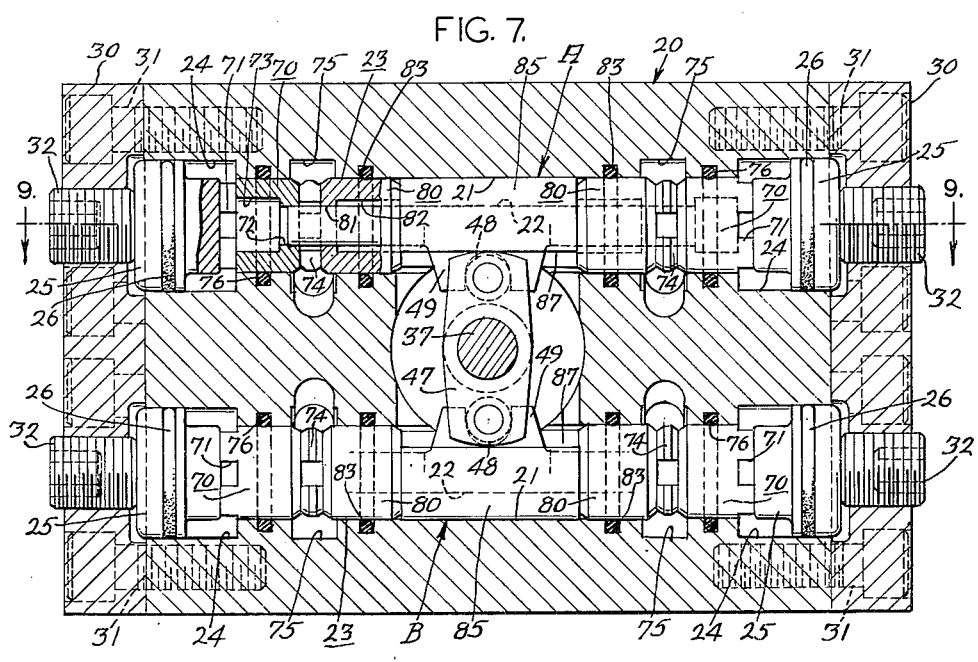
INVENTOR:
PETER E. BAER
BY Howson & Howson
ATTYS.

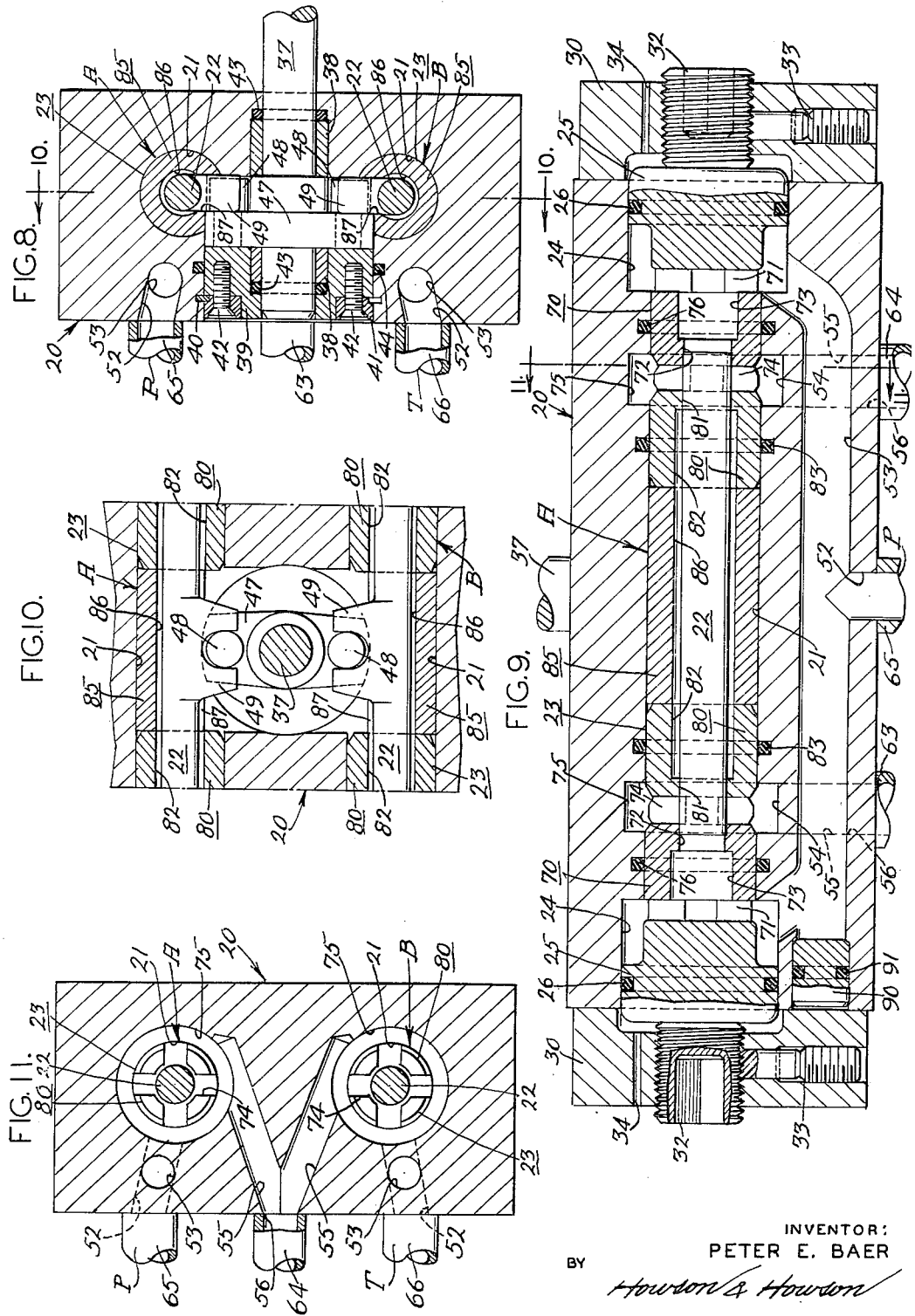

Aug. 10, 1965   P. E. BAER   3,199,535
BALANCED HYDRAULIC VALVE ASSEMBLY
Filed July 13, 1962   6 Sheets-Sheet 4

INVENTOR:
PETER E. BAER
BY Howson & Howson
ATTYS.

Aug. 10, 1965 P. E. BAER 3,199,535
BALANCED HYDRAULIC VALVE ASSEMBLY
Filed July 13, 1962 6 Sheets-Sheet 5
FIG. 17.
FIG. 16a.
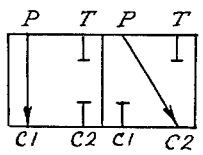
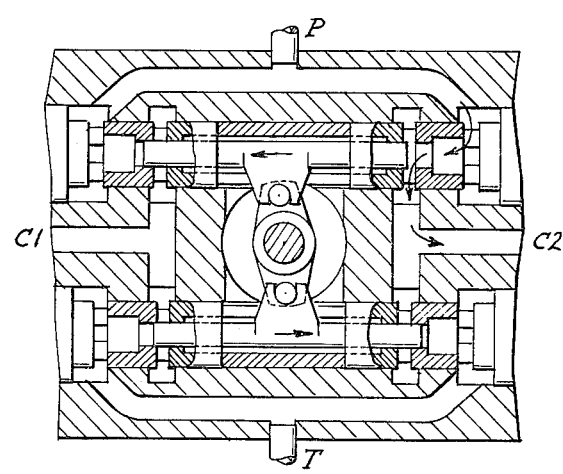
FIG. 18.
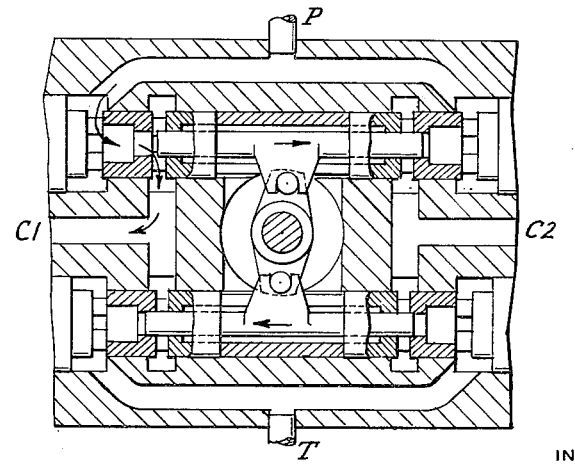
FIG. 16.
INVENTOR:
PETER E. BAER
BY Howson & Howson
ATTYS.

Aug. 10, 1965  P. E. BAER  3,199,535
BALANCED HYDRAULIC VALVE ASSEMBLY
Filed July 13, 1962  6 Sheets-Sheet 6
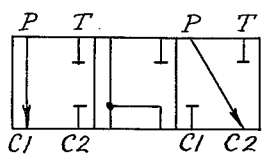
FIG.19a.
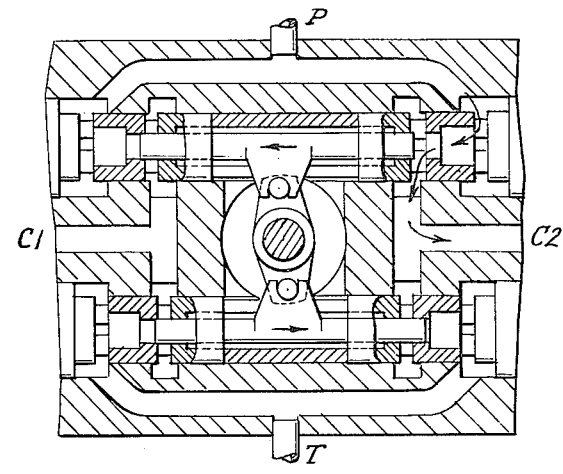
FIG. 20.
FIG. 21.
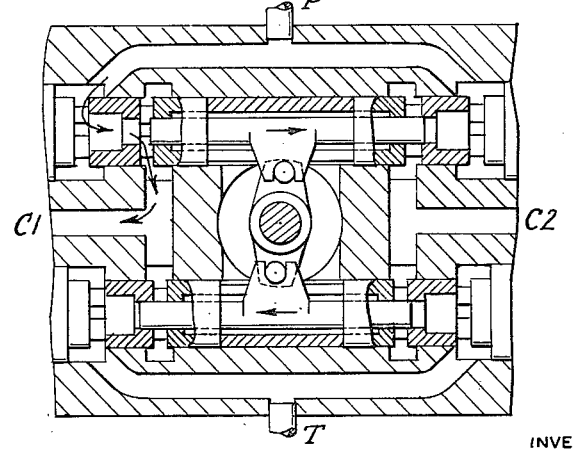
FIG. 19.
INVENTOR:
PETER E. BAER
BY Howson & Howson
ATTYS.

United States Patent Office
3,199,535
Patented Aug. 10, 1965

3,199,535
BALANCED HYDRAULIC VALVE ASSEMBLY
Peter E. Baer, Cheltenham, Md., assignor to Dixon Valve
& Coupling Company, Philadelphia, Pa., a corporation
of Pennsylvania
Filed July 13, 1962, Ser. No. 209,522
4 Claims. (Cl. 137—596)

This invention relates to a balanced hydraulic valve assembly in which the forces imposed by mass, hydraulic pressure, dynamic flow, and transient loads, as by shock and inertia, and jet action are all balanced so that the valve will respond promptly and accurately to its intended operational influences and will not react improperly or impose undue loadings on the equipment which it controls such as when subjected to great shock. The invention also relates to a method of adjusting the valve. The general object of the invention is to provide improvements in this art.

One of the particular objects is to provide a valve piston or spool and cylinder construction in which the spool has both ends equally exposed to hydraulic fluid at the same pressure so that the loadings at opposite ends are equal and balanced for all conditions of operation.

Another object is to provide a piston or spool which can be formed to a given length from an initially formed spool which is the same for all installations of a given size and type.

Another object is to provide a cylinder sleeve arrangement for a valve spool, which sleeve includes components which can be quickly formed to a given length from initially formed parts which are all the same for all installations of a given size and type.

Another object is to provide a piston or spool and cylinder sleeve assembly which can readily be adjusted to shift the axial position of the spool and cylinder sleeve assembly relative to each other. There are two adjustments for each cylinder. The first adjustment is for the position of a sleeve assembly relative to a spool which provides shift of port positions relative to the spool. The other adjustment is provided by sleeve element spacers which can be changed in length to give any one of the crossover variations that may be required. By making various of these adjustments the valve can be made to fulfill various design criteria.

The above and other objects as well as various novel features and advantages of the invention will be apparent from the following description of an exemplary embodiment thereof, reference being made to the accompanying drawings, wherein:

FIG. 1 is a diagrammatic view of a valve and servo motor assembly embodying the invention;

FIG. 2 is a longitudinal sectional view through the valve assembly above, more of the details of construction being shown;

FIG. 2a is a J.I.C. (Joint Industrial Conference) diagram showing the functioning of the FIG. 2 assembly;

FIG. 3 is a top plan view of a valve assembly;

FIG. 4 is a left end elevation of the assembly shown in FIG. 3;

FIG. 5 is a side elevation of the same;

FIG. 6 is a right end elevation of the same;

FIG. 7 is an enlarged vertical axial section taken on the line 7—7 of FIG. 3;

FIG. 8 is an enlarged transverse vertical section taken on the line 8—8 of FIG. 3;

FIG. 9 is a further enlarged horizontal longitudinal section taken on the line 9—9 of FIG. 7;

FIG. 10 is a vertical partial longitudinal section taken on the line 10—10 of FIG. 8;

FIG. 11 is a vertical transverse section taken on the line 11—11 of FIG. 9;

FIG. 12 is a view similar to FIG. 2 but showing a different adjusted relationship of parts, the pistons or spools here being shorter than in FIG. 2;

FIG. 12a is a J.I.C. diagram of the functioning of the FIG. 12 assembly;

FIGS. 16, 16a, 17 and 18 are similar group views showing the action resulting from other sleeve alterations, here the upper and lower sleeves being made of unequal length; and FIGS. 19, 19a, 20 and 21 are similar group views showing the action resulting from other sleeve alterations, the sleeves again being made unequal in length.

Figure 13A:
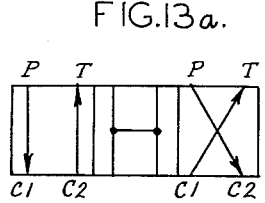
FIG. 13a is a J.I.C. diagram of the functions of the diagrammatic actions of FIGS. 13, 14 and 15.

The valve assembly includes a casing or cylinder block 20 having two spaced parallel bores 21 for two paired cylinder-and-piston units which will be designated for reference as upper cylinder-piston unit A and lower cylinder-piston unit B although no specific orientation is required for operation.

Each cylinder-piston unit, A or B, includes a piston or spool 22 and a sleeve 23 which consitutes the actual cylinder for the piston. The bores 21 are provided at the ends with counter-bores 24 within which are disposed adjusting closure plugs 25 provided with sealing rings 26, O-rings of elastomeric material here being indicated.

The cylinder bores are closed at the ends by end plates 30 which are secured to the casing body, as by screws 31.

The plugs 25 and cylinder sleeves 23 are adjustable axially, as by screws 32, which are held in adjusted position, as by locking means 33. A plug and screw arrangement is here shown as the locking means but, if desired, a soft metal drive pin which can be drilled out may be used. The closed spaces behind the plugs 25 are vented by small vent holes 34 through the plates 30.

The pistons or spools 22 are reciprocated in balanced opposite direction by a transverse oscillating shaft 37 mounted (FIG. 8) in bearings 38 carried by the casing. One of the bearings is formed as a sleeve which is secured in the body of the casing and the other is carried by a removable cap plate 39 which is secured in place by a snap ring 40. A retaining ring 41 is secured over the snap ring 40, as by screws 42, to prevent the snap ring from coming out under shock loading. Sealing rings 43 are provided for the shaft 37 and a sealing ring 44 is provided for the cap plate 39.

The shaft 37 is provided with a crank plate 47 carrying crank pins 48 which engage slots in yokes 49 carried by the pistons 22 for moving the pistons back and forth. The shaft may be connected to any suitable operating means with the casing fixed in position; or, if desired, the shaft may be held in fixed position and the casing oscillated; or both may have some movement.

The casing 20 is provided at top and bottom with center external connection ports 52 and double-ended channels or ducts 53 which lead to the ends of the bores 21 beyond the ends of the pistons. By this arrangement the pistons are subjected to evenly balanced pressure at all times. Although the assembly is entirely symmetrical and balanced and the connections reversible, the upper port 52 will be referred to as the pressure, inlet, or upstream port P and the lower port 52 will be referred to as the tank or sump, outlet or downstream port T.

At a distance from each end of the cylinder bores there are provided transfer ports 54 and channels or ducts 55, the channels 55 (FIG. 11) here being connected in common at an external port 56. In effect, by this arrangement, the bores are cross connected near the ends by the ducts 55. The arrangement is subject to change if the ducts 55 are formed to have separate external ports.

FIG. 1 shows how a servo-motor SM for any desired use may be operated by the present valve assembly. As shown, the servo-motor SM has a cylinder 60 in which operates a piston 61 having a double-ended piston rod 62 for balanced fluid pressure areas on the piston in the chambers on each side of the piston, the chambers being identified as C1 and C2. A fluid line or pipe 63 connects the transfer port 56 at one end of the valve assembly with the chamber C1 and a fluid line or pipe 64 connects the transfer port 56 at the other end of the valve assembly with the chamber C2. A pressure supply pipe or fluid inlet line is designated as 65 and an outlet, return or tank pipe or fluid line is designated as 66.

The cylinder sleeves for the valve pistons or spools 22, which sleeves have been designated in general by the numeral 23, are made in several parts, as best shown in FIG. 9. At each end there is a sleeve segment 70 which has a castellated side-ported spider portion 71 which is engaged by the inner end face of a bore closure plug 25, a bore 72 which closely fits the piston 22, an enlarged end counterbore 73, and an inner castellated side-ported spider portion 74 which is located in connection with the transfer port 54. As here shown, the side-ported castellated portion 71 is formed on the plug 25 but it acts as if formed on the sleeve. An annular bore enlargement 75 which is considerably longer in an axial direction than the port openings of the spider portion 74 surrounds the spider ported portion and connects with the transfer port 54. A sealing ring 76 is provided for the body of each segment 70.

A second sleeve segment 80 near each end has a bore 81 which fits the piston 22 and inner enlarged bore 82 which fully clears the piston. Each sleeve segment 80 is provided with a sealing ring 83.

Lastly, there is an intermediate sleeve segment 85, which has an enlarged interior bore 86 and a side slot 87 (FIG. 8) to accommodate the yoke 49, which is arranged between the ends of the segments 80. When the sleeve segments are all assembled the screws 32 clamp them tightly together in adjusted position.

The longitudinal ducts 53 are preferably formed by drilling the block and the ends can later be sealed, as by a plug 90 having a sealing ring 91. The plugs 90 are retained in place by the end plates 30.

By providing a piston of plain end shape and with actuating means intermediate the ends it is possible to start with a piston of a given length and cut it off on the ends by the amount desired to provide different types of operation. FIG. 2 shows pistons of a length sufficient to extend from near the inner end of the counterbore 73 of one end sleeve segment 70 to near the inner end of the counterbore of the other sleeve segment 70. FIG. 2a shows in J.I.C. diagram form that this arrangement provides a 3-position, 4-way, closed center arrangement with a center zone of considerable length where all ports are closed. If the parts do not pause in center position this is referred to as a 2-position, 4-way setting. For a particular valve assembly taken for reference comparison the sleeve segments 85 here both have a length of 1 9/16". Reversal of operation of the servo-motor occurs at the ends.

FIG. 12 shows the pistons cut off at the ends until the ends just cover the end transfer ports 74 in the center position, the parts otherwise being the same as in FIG. 2. FIG. 12a shows in J.I.C. diagram form how the inactive center space has been eliminated. The active length of the operating stroke of the pistons is considerably less in FIG. 12 than in FIG. 2. The piston ends can be cut off to give any desired range of movement between the FIG. 2 and FIG. 12 conditions.

By cutting off one end only of the pistons the zone of action can be shifted from center position toward either end.

Also by changing the length of the inner sleeve segments 80 many different effects can be obtained.

Figure 14:
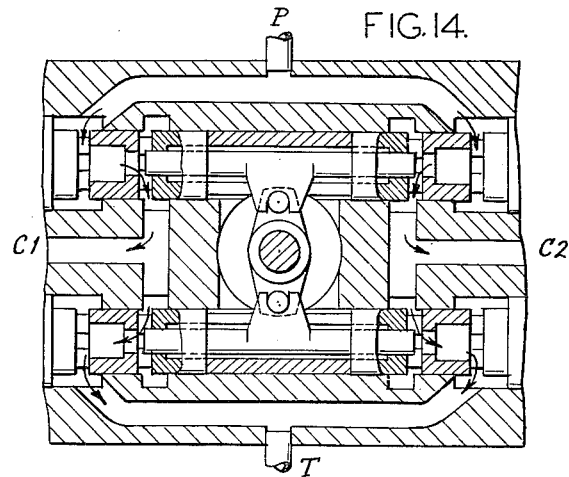
FIGS. 13, 14 and 15 are diagrammatic views showing how a changed sleeve length changes the functioning of the valve assembly, FIG. 13 showing parts in medial position and FIGS. 14 and 15 showing opposite end stroke positions.
Figure 15:
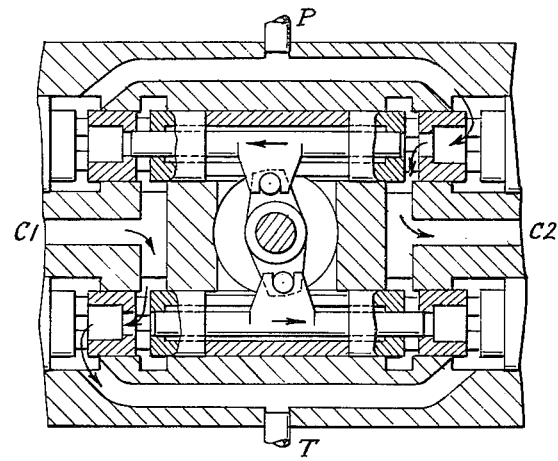
Figure 13:
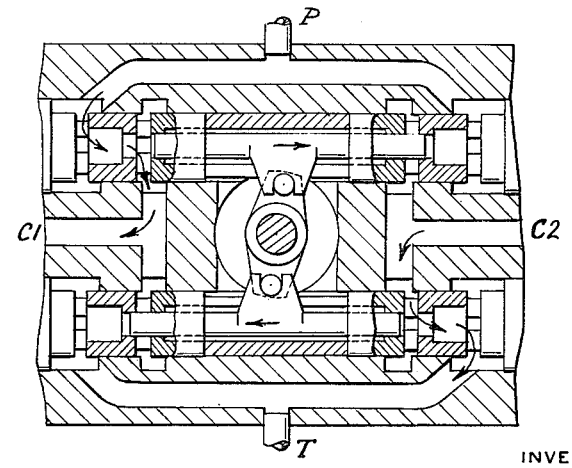

FIGS. 13, 14 and 15 show an arrangement in which both sleeve segments 85 are 1 29/32" long. This, as shown by the J.I.C. diagram of FIG. 13a, is a 3-position, 4-way, open center arrangement.

FIG. 13 shows one end position where pressure P is open to C1 and C2 open to tank.

FIG. 14 shows the center position where pressure P is open at both ends to C1 and C2 and also to tank T.

FIG. 15 shows the other end position where pressure P open to C2 and C1 open to tank T.

FIGS. 16, 17 and 18 show an arrangement in which the upper sleeve segment 85 is 1 25/32" long and the lower sleeve segment is 1 9/16" long. This, as shown by the J.I.C. diagram of FIG. 16a, is a 2-position, 3-way, tank-closed arrangement.

FIG. 16 shows one end position where P is open to C1 and T closed to C2.

FIG. 17 shows the center position where all ports are closed.

FIG. 18 shows the other end position where P is open to C2 and T is closed to C1.

FIGS. 19, 20 and 21 show an arrangement in which the upper sleeve segment 85 is 1 29/32" long and the lower sleeve segment is 1 9/16" long. This, as shown by the J.I.C. diagram of FIG. 19a, is a 3-position, 3-way tank-closed arrangement in which in the center position P is open to both C1 and C2.

FIG. 19 shows one end position in which P is open to C1 and T is closed to C2.

FIG. 20 shows the center position where P is open to both C1 and C2 and T is closed.

FIG. 21 shows the other end position where P is open to C2 and T is closed to C1.

The alterations described above will serve to illustrate the changes which can be made by length change of simple, inexpensive parts. These represent merely a few of the great variety of changes which can be made to give different timing, different power or altered types of operation.

Further, by shifting the whole sleeve assembly axially by the screws 32 the effect of shifting the action from one side to the other from center position is produced. The portings are seen to allow considerable latitude for these adjustments and the range can be increased if desired.

It is possible to finish the piston and its bores so precisely that there is substantially no leakage and no anti-leak rings are needed. Therefore, when the relative lengths are changed there is substantially no change in operating efficiency.

The manufacturer is hereby provided with apparatus and method of adjustment whereby with standard parts initially provided or with simple parts which can be selected and by simple machine procedures he can obtain a wide variety of valve actions.

By reason of its complete hydraulic balance against dynamic, or jet, and shock pressures, this valve can be operated by any of the normal means of activation, such as manual, hydraulic, solenoid, rotary magnet, servo motor, etc., and will not require a pilot valve for operation in any size under any given system pressure. Most existing valves from 1/2" up require a 1/4" pilot valve for activation since the slave valve requires hydraulic assistance to move the mass. The present invention, because of its hydraulic balance allows a light spool construction of low mass to be used, hence does not require a pilot valve.

The valve will deliver from 30–50% increase in volume at equivalent pressure drop.

By reason of its construction the valve has complete use of all ports without the use of a drain line. This is possible because there is no volumetric change of fluid or mass. This is a very great advantage.

By reason of the fact that only the ends and part of the circumference near the ends of the spools are subjected to system pressure, it is unnecessary, except under servo conditions to run a fifth line to tank.

By having the ends of the spools include hydraulic radii a great measure of sound attenuation is effected.

It is thus seen that the invention provides a relatively simple, light and balanced valve which can be altered for a great variety of operations and will not be disturbed in its operation by jet or shock forces.

While one embodiment of the invention has been described for purposes of illustration it is to be understood that there may be various embodiments and modifications within the general scope of the invention.

I claim:

1. A hydraulic valve assembly comprising in combination: a casing having a pair of spaced, axially extending, parallel, cylinder bores therein and an axially slidable cylinder sleeve unit mounted in each of said bores; each of said cylinder sleeve units comprising a plurality of axially aligned parts having a bore therein; first fluid duct connections from a common fluid source connecting the ends of one of said sleeve receiving bores, and second fluid duct connections from a common fluid source connecting the ends of said other sleeve receiving bore; ports near each end of each of said sleeves and spaced inwardly of said fluid duct connections; an axially extending valve piston positioned in each of said bores of said sleeves, said pistons having an axial length less than the distance between associated duct connections whereby at all times only the opposite ends of said pistons are exposed to fluid from their associated duct connections thereby providing hydraulically balanced pistons in all positions; means interconnecting said valve pistons to reciprocate said pistons, said pistons cooperating with said ports to control the flow of fluid through said ports; and means positioned in said bore at either end of said sleeve units engaging the ends thereof to adjust said cylinder sleeve unit parts relative to said casing and said piston.

2. A hydraulic valve assembly in accordance with claim 1 wherein said ports associated with said one sleeve are connected to said like ports associated with said other sleeve, and including a channel leading to the exterior of said casing from said cross-connected ports.

3. A hydraulic valve assembly in accordance with claim 2 wherein each of said sleeve units comprise a pair of spaced annular sleeve segments abutting an intermediate sleeve segment, a pair of axially spaced annuli, each positioned on the end of one of said annular sleeve segments and having a side ported spider portion engaging said sleeve segments, said side ported spider portion overlying said ports; and wherein said positioning means engaging the ends of said cylinder sleeve units are positioned outboard of said annuli.

4. A hydraulic valve assembly in accordance with claim 1 wherein said means, interconnecting said valve pistons to reciprocate said pistons, comprises a transverse oscillating shaft mounted in said casing between said valve pistons whereby said pistons are reciprocated in balanced opposite directions.

References Cited by the Examiner

UNITED STATES PATENTS

| | | | |
|---|---|---|---|
| 701,574 | 6/02 | King | 137—625.69 |
| 765,867 | 7/04 | Watters | 137—596 XR |
| 1,395,756 | 11/21 | McReynolds et al. | 137—625.69 |
| 2,526,361 | 10/50 | Johnson | 137—625.6 X |
| 2,630,135 | 3/53 | Johnson | 137—625.69 X |
| 2,630,136 | 3/53 | Brandes | 137—625.65 |
| 2,904,055 | 9/59 | Witherell | 137—625.62 |
| 3,081,794 | 3/63 | Lucien | 137—625.69 |
| 3,135,294 | 6/64 | Huber | 137—625.61 |

FOREIGN PATENTS

| | | |
|---|---|---|
| 593,079 | 2/60 | Canada. |
| 785,397 | 10/57 | Great Britain. |

M. CARY NELSON, *Primary Examiner.*

LAVERNE D. GEIGER, *Examiner.*